US006811603B2

(12) United States Patent
Brothers et al.

(10) Patent No.: US 6,811,603 B2
(45) Date of Patent: Nov. 2, 2004

(54) METHODS, WELL CEMENT COMPOSITIONS AND LIGHTWEIGHT ADDITIVES THEREFOR

(75) Inventors: Lance E. Brothers, Chickasha, OK (US); Krista L. Keener, Duncan, OK (US); James A. Braden, Duncan, OK (US); Jan Pieter Vijn, Liederdorp (NL); Bach Dao, Nieuw Vennep (NL)

(73) Assignee: Halliburton Energy Services, Inc., Ducnan, OK (US)

( * ) Notice: Subject to any disclaimer, the term of this patent is extended or adjusted under 35 U.S.C. 154(b) by 16 days.

(21) Appl. No.: 10/603,483

(22) Filed: Jun. 25, 2003

(65) Prior Publication Data

US 2004/0007163 A1 Jan. 15, 2004

Related U.S. Application Data

(60) Division of application No. 10/103,449, filed on Mar. 21, 2002, now Pat. No. 6,631,766, which is a continuation-in-part of application No. 10/005,266, filed on Dec. 3, 2001, now Pat. No. 6,601,647.

(51) Int. Cl.[7] .................................................. C04B 14/10
(52) U.S. Cl. ........................................ 106/718; 106/811
(58) Field of Search .................................. 106/718, 811

(56) References Cited

U.S. PATENT DOCUMENTS

| | | | | |
|---|---|---|---|---|
| 3,804,058 A | | 4/1974 | Messenger | 166/292 |
| 3,902,911 A | | 9/1975 | Messenger | 106/97 |
| 4,095,988 A | * | 6/1978 | Jancek et al. | 106/706 |
| 4,234,344 A | | 11/1980 | Tinsley et al. | 106/88 |
| 4,252,193 A | | 2/1981 | Powers et al. | 166/292 |
| 4,370,166 A | | 1/1983 | Powers et al. | 106/97 |
| 4,618,376 A | | 10/1986 | Saternus et al. | 134/26 |
| 5,728,209 A | * | 3/1998 | Bury et al. | 106/819 |
| 6,173,778 B1 | | 1/2001 | Rae et al. | 166/293 |
| 6,196,316 B1 | | 3/2001 | Bosma et al. | 166/294 |
| 6,258,160 B1 | | 7/2001 | Chatterji et al. | 106/705 |
| 6,601,647 B2 | * | 8/2003 | Brothers et al. | 166/293 |
| 6,631,766 B2 | * | 10/2003 | Brothers et al. | 166/293 |
| 6,648,961 B2 | * | 11/2003 | Brothers et al. | 106/692 |
| 6,660,078 B2 | * | 12/2003 | Brothers et al. | 106/705 |

FOREIGN PATENT DOCUMENTS

| | | |
|---|---|---|
| NO | 167649 | 7/1993 |
| WO | WO 90/11977 | 10/1990 |

OTHER PUBLICATIONS

Halliburton brochure entitled "Spherelite Cement Additive" dated 1999.

Paper entitled "Cementing" by Dwight K. Smith, pp. 21–27, 1990.

* cited by examiner

*Primary Examiner*—Paul Marcantoni
(74) *Attorney, Agent, or Firm*—Craig W. Roddy; C. Clark Dougherty, Jr.

(57) ABSTRACT

The present invention provides methods, lightweight well cement compositions and additives for the well cement compositions. The methods of the invention for sealing pipe in a well bore penetrating a zone or formation which readily fractures at low hydrostatic pressure is basically comprised of the steps of providing a lightweight cement composition comprised of a hydraulic cement, water and an additive comprising an aqueous suspension of microspheres containing a water swellable clay suspending agent, placing the cement composition in the annulus between the pipe and the well bore and allowing the cement composition to set.

20 Claims, No Drawings

METHODS, WELL CEMENT COMPOSITIONS AND LIGHTWEIGHT ADDITIVES THEREFOR

CROSS-REFERENCE TO RELATED APPLICATION

This application is a divisional of application Ser. No. 10/103,449 filed on Mar. 21, 2002 now U.S. Pat. No. 6,631,766, which is a continuation-in-part of application Ser. No. 10/005,266 filed on Dec. 3, 2001 now U.S. Pat. No. 6,601,647.

BACKGROUND OF THE INVENTION

1. Field of the Invention

The present invention relates to methods, compositions and lightweight additives for sealing pipe strings in well bores, and more particularly, to such methods, compositions and additives wherein the well bores penetrate formations that readily fracture at low hydrostatic pressures.

2. Description of the Prior Art

Hydraulic cement compositions are commonly utilized in oil, gas and water well completion and remedial operations. For example, hydraulic cement compositions are used in primary cementing operations whereby strings of pipe such as casing and liners are cemented in well bores. In performing primary cementing, a hydraulic cement composition is pumped into the annular space between the walls of a well bore and the exterior of a string of pipe disposed therein: The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some well locations, the subterranean zones or formations into or through which wells are drilled have high permeabilities and low compressive and tensile strengths. As a result, the resistance of the zones or formations to shear are low and they have low fracture gradients. When a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost. While lightweight cement compositions have been developed and used, subterranean zones or formations are often encountered which have fracture gradients too low for the lightweight cement compositions to be utilized without the formation of fractures and the occurrence of lost circulation problems.

Thus, there are needs for improved lightweight cement compositions for sealing pipe such as casings and liners in well bores which penetrate zones or formations having very low fracture gradients.

SUMMARY OF THE INVENTION

The present invention provides lightweight well cement compositions, additives for use in the compositions and methods of using the lightweight compositions for sealing pipe in well bores penetrating zones or formations having low fracture gradients which meet the needs described above and overcome the deficiencies of the prior art. The methods of this invention basically comprise the steps of providing a lightweight cement composition comprised of a hydraulic cement, water and an additive comprising a suspension of microspheres in water gelled or thickened with a water swellable clay suspending agent. The cement composition is placed into the annulus between a pipe and the walls of a well bore and the sealing composition is allowed to set into a hard impermeable mass.

A lightweight sealing composition of this invention is basically comprised of a hydraulic cement, water and an additive for making the cement composition lightweight.

The additives of this invention are comprised of aqueous suspensions of microspheres gelled or thickened with a water swellable clay suspending agent.

It is, therefore, a general object of the present invention to provide methods, lightweight well cement compositions and additives for use in cementing pipe in well bores.

Other and further objects, features and advantages of the present invention will be readily apparent to those skilled in the art upon a reading of the description of preferred embodiments which follows.

DESCRIPTION OF PREFERRED EMBODIMENTS

By the present invention, methods, lightweight well cement compositions and additives therefor are provided for sealing pipes in well bores penetrating zones or formations which readily fracture at low hydrostatic pressures. The methods of this invention for sealing a pipe in a well bore penetrating a zone or formation which readily fractures at low hydrostatic pressures is basically comprised of providing a lightweight cement composition comprised of a hydraulic cement, water and an additive comprising a suspension of microspheres in water gelled or thickened with a water swellable clay suspending agent. The lightweight cement composition is placed into the annulus between the exterior surfaces of the pipe and the walls of the well bore and the cement composition is allowed to set into a hard impermeable mass therein.

A variety of hydraulic cements can be utilized in accordance with the present invention including those comprised of calcium, aluminum, silicon, oxygen and/or sulfur which set and harden by reaction with water. Such hydraulic cements include Portland cements, slag cements, pozzolana cements, gypsum cements, aluminous cements and silica cements. Portland cements or their equivalents are generally preferred for use in accordance with the present invention. Portland cements of the types defined and described in the *API Specification For Materials And Testing For Well Cements*, API Specification 10, $5^{th}$ Edition, dated Jul. 1, 1990 of the American Petroleum Institute are particularly suitable. Preferred API Portland cements include Classes A, B, C, G and H with Classes G and H being more preferred, and Class G being the most preferred.

The mix water utilized to form the cement compositions of this invention can be fresh water, unsaturated salt solutions or saturated salt solutions. The water is included in the cement compositions of this invention in an amount in the range of from about 60% to about 250% by weight of hydraulic cement therein.

The additive which is included in the cement compositions of this invention to make the compositions lightweight is basically comprised of a suspension of microspheres in water gelled or thickened with a water swellable clay suspending agent. While various microspheres can be utilized, fly ash microspheres are preferred for use in the present invention. Particularly suitable such fly ash microspheres are commercially available from Halliburton Energy Services, Inc. of Duncan, Okla. under the tradename "SPHERELITE™". Another type of microspheres that can be used is synthetic hollow glass microspheres commercially available from Minnesota Mining and Manufacturing Company (3M™) under the tradename "SCOTCHLITE™". These very low density microspheres are formed of a chemically stable soda-lime borosilicate glass composition which is non-porous. The microspheres used are included in the aqueous microsphere suspension in a general amount in the range of from about 30% to about 100% by weight of water in the suspension. Preferably, the microspheres are included in the suspension in an amount of about 67% by weight of water therein.

The water swellable clay suspending agents which, can be used include, but are not limited to sodium bentonite, attapulgite, kaolinite, meta-kaolinite, hectorite or sepiolite. Of these, sodium bentonite is preferred. The clay suspending agent used is included in the aqueous suspension in an amount in the range of from about 1% to about 4% by weight of the water therein, preferably an amount of about 2% by weight of the water therein.

The lightweight additive is included in the cement composition in an amount in the range of from about 30% to about 100% by weight of hydraulic cement therein.

As will be understood by those skilled in the art, various conventional additives can be included in the lightweight sealing compositions of this invention including, but not limited to, set retarders, set accelerators, fluid loss control additives and dispersants.

A preferred method of this invention for sealing pipe in a well bore penetrating a zone or formation which readily fractures at low hydrostatic pressures is comprised of the steps of: (a) providing a lightweight cement composition comprised of a hydraulic cement, mix water and an additive comprising an aqueous suspension of microspheres containing a water swellable clay suspending agent; (b) placing the cement composition between the exterior surfaces of the pipe and the walls of the well bore; and (c) allowing the cement composition to set into a hard impermeable mass.

A more preferred method of the present invention for sealing pipe in a well bore penetrating a zone or formation which readily fractures at low hydrostatic pressures is comprised of the steps of: (a) providing a lightweight cement composition comprised of a hydraulic cement, mix water present in the composition in an amount in the range of from about 60% to about 250% by weight of the hydraulic cement therein and an additive comprising an aqueous suspension of microspheres containing water, fly ash microspheres and a sodium bentonite suspending agent present in the cement composition in an amount in the range of from about 30% to about 100% by weight of hydraulic cement therein; (b) placing the cement composition into the annulus between the pipe and the walls of the well bore; and (c) allowing the cement composition to set into a hard impermeable mass.

A preferred lightweight well cement composition of this invention is comprised of: a hydraulic cement; mix water selected from the group of fresh water, unsaturated salt solutions and saturated salt solutions present in an amount in the range of from about 60% to about 250% by weight of the hydraulic cement in the composition; and an additive comprised of an aqueous suspension of microspheres containing water, microspheres and a sodium bentonite suspending agent present in an amount in the range of from about 30% to about 100% by weight of hydraulic cement in the composition.

A preferred lightweight cement composition additive of this invention is comprised of an aqueous suspension of microspheres containing water, microspheres and a sodium bentonite suspending agent.

A more preferred lightweight cement composition additive of this invention is comprised of: an aqueous suspension of fly ash microspheres containing water, fly ash microspheres and a sodium bentonite suspending, agent, the fly ash microspheres being present in an amount in the range of from about 30% to about 100% by weight of water in the additive; and the sodium bentonite suspending agent being present in an amount in the range of from about 1% to about 4% by weight of water in the additive.

The most preferred lightweight cement composition additive of this invention is comprised of: an aqueous suspension of fly ash microspheres containing water, fly ash microspheres and a sodium bentonite suspending agent, the fly ash microspheres being present in an amount of about 67% by weight of water in the additive; and the sodium bentonite being present in an amount of about 2% by weight of water in the additive.

In order to further illustrate the methods, the lightweight well cement compositions and the additives of this present invention, the following examples are given.

EXAMPLE

A lightweight additive of this invention was prepared by hydrating 20 grams of sodium bentonite in 1000 grams of water. To 600 grams of the resulting water gelled with sodium bentonite, 400 grams of fly ash microspheres were added. 300 grams of Portland cement were then mixed with 300 grams of the lightweight additive and 150 grams of fresh water. The resulting cement slurry was subjected to 4000 psi of pressure to simulate the hydraulic pressure at the bottom of a well bore. After being subjected to the applied pressure, the density of the slurry was 11.2 lb/gal. The slurry was poured into a plexiglass tube measuring 12 inches in length and 1.75 inches internal diameter. The slurry was then allowed to set to form a hardened mass after which a one inch section was cut from the top and bottom of the plexiglass tube. The hardened cement was removed from the one inch sections of the tube and their densities determined. The density of the bottom section was 11.1 lb/gal and the density of the top section was 11.3 lb/gal. This shows that, within experimental error, the cement was uniform in density and the experimental liquid additive was effective in preparing a lightweight cement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:

a hydraulic cement;

water present in an amount in the range of from about 60% of about 250% by weight of hydraulic cement therein; and an additive comprising an aqueous suspension of microspheres and a water swellable clay suspending agent present in an amount in the range of from about 30% to about 100% by weight of hydraulic cement therein.

2. The composition of claim 1 wherein said hydraulic cement is selected from the group of Portland cements, slag cements, pozzolana cements, gypsum cements, aluminous cements and silica cements.

3. The composition of claim 1 wherein said hydraulic cement is Portland cement.

4. The composition of claim 1 wherein said water is selected from the group consisting of fresh water, unsaturated salt solutions and saturated salt solutions.

5. The composition of claim 1 wherein said microspheres are fly ash micropheres.

6. The composition of claim 1 wherein said microspheres are synthetic hollow glass microspheres.

7. The composition of claim 1 wherein said microspheres are formed of a chemically stable soda-lime borosilicate glass composition.

8. The composition of claim 7 wherein said chemically stable soda-lime borosilicate glass composition is non-porous.

9. The composition of claim 1 wherein said microspheres are present in said additive in an amount in the range of from about 30% to about 100% by weight of water in said additive.

10. The composition of claim 1 wherein said microspheres are present in said additive in an amount of about 67% by weight of water in said additive.

11. The composition of claim 1 wherein said clay suspending agent is selected from the group consisting of sodium bentonite, attapulgite, kaolinite, meta-kaolinite, hectorite and sepiolite.

12. The composition of claim 1 wherein said clay suspending agent is sodium bentonite.

13. The composition of claim 12 wherein said sodium bentonite is present in said additive in an amount of about 2% by weight of water in said additive.

14. The composition of claim 1 wherein said clay suspending agent is present in said additive in an amount in the range of from about 1% to about 4% by weight of water in aid additive.

15. A cement composition comprising:

a hydraulic cement;

water; and an additive present in an amount in the range of from about 30% to about 100% by weight of hydraulic cement therein comprising:

an aqueous suspension of microspheres selected from the group consisting of fly ash microspheres and synthetic hollow glass microspheres present in said additive in an amount in the range of from about 30% to about 100% by weight of water in said additive; and a water swellable clay suspending agent selected from the group consisting of sodium bentonite, attapulgite, kaolinite, meta-kaolinite, hectorite and sepiolite present in said additive in an amount in the range of from about 1% to about 4% by weight of water in said additive.

16. The composition of claim 15 wherein said hydraulic cement is selected from the group of Portland cements, slag cements, pozzolana cements, gypsum cements, aluminous cements and silica cements.

17. The composition of claim 15 wherein said hydraulic cement is Portland cement.

18. The composition of claim 15 wherein said water is selected from the group consisting of fresh water, unsaturated salt solutions and saturated salt solutions.

19. The composition of claim 15 wherein said water is present in an amount in the range of from about 60% to about 250% by weight of hydraulic cement therein.

20. A cement composition comprising:

a hydraulic cement selected from the group of Portland cements, slag cements, pozzolana cements, gypsum cements, aluminous cements and silica cements;

water selected from the group consisting of fresh water, unsaturated salt solutions and saturated salt solutions present in an amount in the range of from about 60% to about 250% by weight of hydraulic cement therein; and an additive present in an amount in the range of from about 30% to about 100% by weight of hydraulic cement therein comprising:

an aqueous suspension of microspheres selected from the group consisting of fly ash microspheres and synthetic hollow glass microspheres present in said additive in an amount in the range of from about 30% to about 100% by weight of water in said additive; and a water swellable clay suspending agent selected from the group consisting of sodium bentonite, attapulgite, kaolinite, meta-kaolinite, hectorite and sepiolite present in said additive in an amount in the range of from about 1% to about 4% by weight of water in said additive.

* * * * *